United States Patent
Kohlmeier-Beckmann et al.

(10) Patent No.: US 7,905,638 B2
(45) Date of Patent: Mar. 15, 2011

(54) AIRCRAFT LIGHT SOURCE WITH AT LEAST ONE LIGHT-EMITTING DIODE AND A DIFFUSER

(75) Inventors: Carsten Kohlmeier-Beckmann, Buxtehude (DE); Horst-Dieter Schilling, Bremen (DE)

(73) Assignee: Airbus Deutschland GmbH, Hamburg (DE)

( * ) Notice: Subject to any disclaimer, the term of this patent is extended or adjusted under 35 U.S.C. 154(b) by 67 days.

(21) Appl. No.: 11/779,572

(22) Filed: Jul. 18, 2007

(65) Prior Publication Data
US 2008/0025032 A1    Jan. 31, 2008

(30) Foreign Application Priority Data
Jul. 27, 2006 (DE) .......................... 10 2006 034 817

(51) Int. Cl.
*B64D 47/02*     (2006.01)
(52) U.S. Cl. ................... 362/470; 362/471; 362/326
(58) Field of Classification Search .................. 362/326, 362/470–472, 493
See application file for complete search history.

(56) References Cited

U.S. PATENT DOCUMENTS

| | | | |
|---|---|---|---|
| 7,097,339 B2* | 8/2006 | Chou et al. | 362/612 |
| 7,494,255 B2* | 2/2009 | Bryan et al. | 362/471 |
| 7,540,639 B2* | 6/2009 | Clark | 362/471 |
| 2003/0156422 A1* | 8/2003 | Tatewaki et al. | 362/487 |
| 2003/0174499 A1* | 9/2003 | Bohlander | 362/240 |
| 2005/0237754 A1* | 10/2005 | Klettke | 362/471 |
| 2006/0098452 A1* | 5/2006 | Choi et al. | 362/607 |
| 2007/0087459 A1* | 4/2007 | Erchak et al. | 438/22 |
| 2007/0236939 A1* | 10/2007 | Ouderkirk et al. | 362/339 |
| 2007/0268698 A1* | 11/2007 | Chen et al. | 362/250 |
| 2008/0013332 A1* | 1/2008 | Kohlmeier-Beckmann et al. | 362/470 |

* cited by examiner

*Primary Examiner* — Evan Dzierzynski
(74) *Attorney, Agent, or Firm* — Wood, Herron & Evans, L.L.P.

(57) ABSTRACT

An aircraft cabin panel includes an aircraft cabin lighting seamlessly integrated with the panel. The aircraft cabin lighting includes at least one light emitting diode or LED and a diffuser. The diffuser includes a first body with a first index of refraction and a plurality of second bodies which are arranged in the first body and having a second index of refraction.

16 Claims, 1 Drawing Sheet

AIRCRAFT LIGHT SOURCE WITH AT LEAST ONE LIGHT-EMITTING DIODE AND A DIFFUSER

TECHNICAL FIELD

Figure 1:
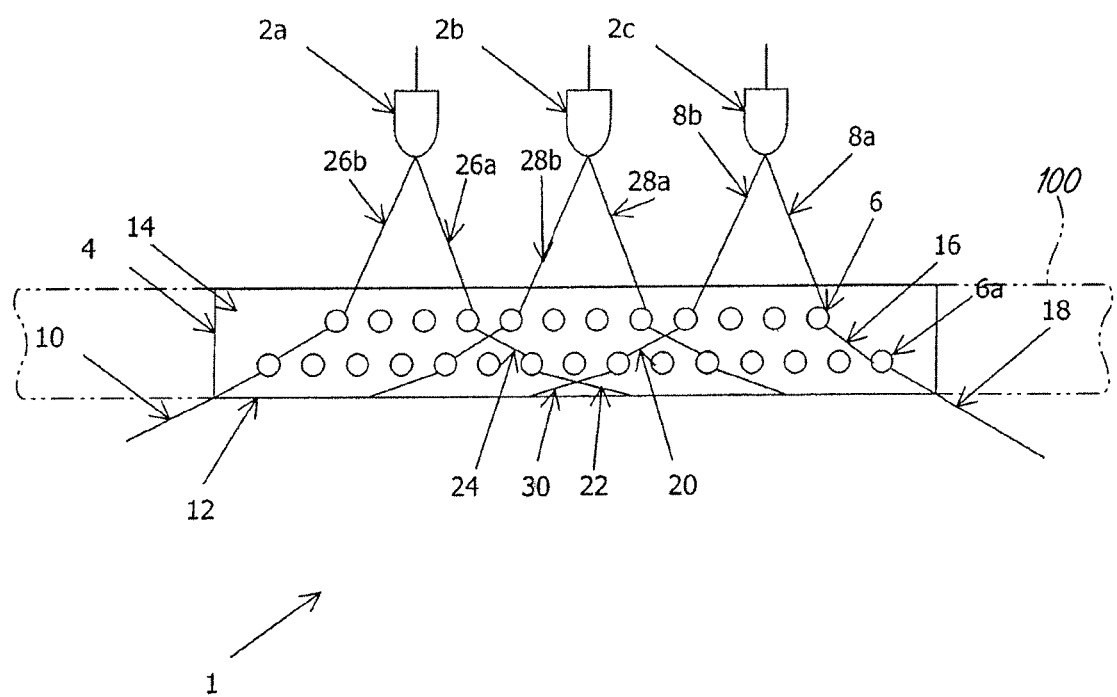

The invention relates to an improved aircraft light source with at least one light-emitting diode and an improved diffuser.

BACKGROUND

In aircrafts, light-emitting diodes (LEDs) are increasingly used as lighting means, because compared with traditional lighting means, relative to their mass, their power consumption and the generated waste heat, they radiate light at higher intensity. LEDs are offered with increasingly higher power, but their aperture angle compared with traditional lighting means is relatively small, and the angle of emission of the light beam from the LED can vary. The beam of a LED can be widened by means of a diffuser. Because of the narrow space conditions in an aircraft, the distance between the LED and the diffuser is relatively low.

The diffusers which are usually used in an aircraft for an aircraft light source comprise a transparent plastic material, into which a specified quantity of white scattering particles, e.g. titanium dioxide granules, is mixed. The diffusion, i.e. the random light mixing, is achieved by multiple reflection of the light as it passes through the diffuser. However, as with every reflection, part of the light energy is absorbed and reflected (back) in the wrong direction.

Therefore, because of the desired flat form of the aircraft light source, the result, as previously mentioned, is a relatively low distance between a light source and a diffuser. Therefore, either the proportion of scattering particles must be very great, and/or the thickness of the diffuser must be very great. Both measures result in considerable light losses, with the result that lighting means with an increased lighting power must be used, and/or the number of lighting means must be increased, which results in an additional space requirement, an increase of mass and an increased power consumption. Additionally, to illuminate the cabin a plurality of LEDs can be used, at least one LED emitting light at a wavelength which differs from the wavelength of the light which another LED emits. For instance, if red, yellow and blue light, each of which is generated by a LED which emits red, yellow and blue light respectively, are radiated onto the diffuser, light output which in total is white can be generated. By varying the portion of red light and/or blue light, the color temperature of the light which the aircraft light source emits can be varied. For instance, the portion of red light can be increased when the passengers want to relax. On the other hand, the portion of blue light can be increased if it is desirable to increase the attentiveness of the passengers. Further, a tint which the user wants in each application case can be given to the light which is emitted into the cabin. As previously mentioned, LEDs have a relatively small angle of radiation and are close to the diffuser. Consequently, for sufficiently good color mixing, a diffuser with a high density of scattering particles and/or a thick diffuser is required, resulting in high losses of intensity.

There is also a need for overhead or side panels in the form of lighting surfaces.

It is an object of the invention to create an improved aircraft light source.

SUMMARY

The object is achieved by an aircraft light source which comprises at least one LED and a diffuser. The diffuser has one body with a first index of refraction and a plurality of second bodies which are arranged in the first body and have a second index of refraction. In the case of this diffuser, the light is deflected at the transition from the first body to the second body and vice versa, because these have a different index of refraction. Because the light is essentially not absorbed or reflected, the light losses are comparatively small. A traditional diffuser, e.g. a diffuser which is based on a white dyed material, a surface which is structured on both sides, or titanium dioxide granules, has a degree of transmission $\tau$ of about 0.4 to about 0.5. The diffuser which is used with the aircraft light source according to the invention, with a first body which has a first index of refraction and multiple second bodies which are arranged in the first body and have a second index of refraction, has a degree of transmission $\tau$ of about 0.8 to 0.9. By varying the thickness of the diffuser, the number and/or size of the second bodies, a desired degree of diffusion can be set. For instance, the thickness of the diffuser is about 1 mm to about 3 mm, preferably about 2 mm. The size of the second bodies is for instance about 10 µm to about 70 µm, preferably about 40 µm.

The first body can comprise a flame-retardant material, and/or the second bodies can have a flame-retardant material. The materials which are used in an aircraft are subject to approval regulations. These provide that the materials which are used in an aircraft are essentially flame-retardant. The first body can have a plastic material, e.g. polycarbonate. The second body can have glass. Both polycarbonate and glass are flame-retardant materials, so that approval of them for use in aircraft is not critical. Flame-retardant in the context of the present invention can also be interpreted as flame-resistant.

Polycarbonate is also preferred as the material for the first body because it has a relatively good resistance against acids and alkaline fluids. The first body can be the carrier for the plurality of second bodies, and is, for instance, arranged on the outside of an overhead or side panel. Because polycarbonate is relatively resistant to acids and alkaline fluids, it can be well cleaned using normal cleaning materials.

The second bodies can be essentially spherical, resulting in specially high deflection and refraction of the light, and thus particularly good beam divergence and/or light mixing. The second bodies can be distributed in several planes of the first body, i.e. from the point of view of a passing-through light beam they are arranged in succession, resulting in a further improved beam divergence and light mixing.

In operation, the LED has a predefined light cone, and the diffuser has a predefined light emission area. The LED and the diffuser can be spaced at such a distance from each other that the area on the light entry side of the diffuser which is illuminated by the light cone of the LED is smaller than the radiating area, which the diffuser generates from the light cone, on the light emission area of the diffuser. The second bodies can refract the light which enters on the light entry side of the diffuser in such a way that it exits on the light emission side of the diffuser at a position which on the light entry side of the diffuser is not illuminated by a LED. The result is an aircraft light source with specially uniform light output.

The aircraft light source can comprise a plurality of LEDs, the plurality of LEDs and the diffuser being spaced at such a distance from each other that the light cones of the LEDs do not overlap. Because the second bodies, as described above, can deflect the light laterally, the result is an aircraft light source with a uniform light output, although the diffuser on the light entry side is not illuminated uniformly.

The aircraft light source can comprise a plurality of LEDs, at least one LED emitting light of a different wavelength than another LED, and the plurality of LEDs and the diffuser being spaced at such a distance from each other that the light cones of the LEDs do not overlap. As mentioned above, the second bodies can deflect the light which enters on the light entry side laterally and/or refract it, and thus mix it, so that on the light emission side of the diffuser the result is a uniform light output with respect to location and color. The aircraft light source can comprise a plurality of LEDs, at least one LED emitting light of a different wavelength than another LED, and the plurality of LEDs and the diffuser being spaced at such a distance from each other that the light cones of the LEDs at least partly overlap.

The aircraft light source can be aircraft cabin lighting. The aircraft light source can also be used as a position light or as a floodlight, for instance on a nose wheel or aerofoil.

The invention is now explained in more detail on the basis of FIG. 1, which shows a schematic cross-section through the aircraft light source according to the invention.

DETAILED DESCRIPTION

The aircraft light source 1 comprises a diffuser 4 with a first body 14 of material with a first index of refraction. The diffuser 4 further comprises a plurality of second bodies 6 of material with a second index of refraction, which in the shown embodiment are received in the first body 14. The aircraft light source further comprises at least one LED, in the shown embodiment three LEDs 2a, 2b, 2c. As mentioned above, the thickness of the diffuser is about 1 mm to about 3 mm, preferably about 2 mm. The size of the second bodies 6 is for instance about 10 µm to about 70 µm, preferably about 40 µm.

The first body 14 can have a plastic, e.g. polycarbonate. The second bodies 6 can be of spherical shape and comprise glass. The first index of refraction of the first body 14 differs from the second index of refraction of the second bodies 6. The second index of refraction can be higher than the first index of refraction, resulting in a high refraction and/or deflection of a light beam passing through the second body. However, configurations in which the first index of refraction is higher than the second index of refraction are also possible.

On the basis of FIG. 1, the light scattering and light mixing which can be achieved by the diffuser 4 are now explained. In FIG. 1, edge beams 8a, 8b, 16, 18, 20, 24, 26a, 28a, 28b, 10, 30 are shown schematically. For the purposes of this description, the term "edge beam" designates the beam which runs at the edge of the light cone of a LED 2a, 2b, 2c. Self-evidently, further beams run within the light cone. The LED 2c emits a light cone with a relatively small aperture angle. The edge beam 8a of the light cone enters the first body 14 of the diffuser 4 and there enters the second body 6. The second body 6 has a higher index of refraction than the first body 14. Thus the edge beam 8 is refracted into the edge beam 16. In this example, the edge beam 16 is refracted away from the axis of symmetry (not shown) of the light cone of the LED 2c. Consequently, the light cone now has a greater aperture angle. At another second body 6a, the edge beam 16 is refracted further away from the axis of symmetry of the light cone, into the edge beam 18. The edge beam 18 exits at the edge of the light emission area 12 of the diffuser 4. The light emitting area of the radiating area of the diffuser on the light emitting side is greater than the area which is illuminated on the light entry side by the light cone of the LED. Further, the light cone which the diffuser 4 emits, with the edge beam 18, has a significantly greater aperture angle than the light cone which the third LED 2c emits, with the edge beam 8a.

The aircraft light source according to the invention can also mix light of different colors. For instance, the first LED 2a can emit red light, the second LED 2b yellow light, and the third LED 2c blue light. The edge beam 26a of the light cone which the first LED 2a emits enters the first body 14 of the diffuser 4. The edge beam 26a is refracted by one of the plurality of second bodies 6 into the edge beam 24, and by another of the second bodies 6 into the edge beam 22, and exits from the first body 14 of the diffuser 4. The light cone which the third LED 2c generates has an edge beam 8b, which enters the first body 14 of the diffuser 4 and is there refracted by one of the second bodies 6 outward, away from the axis of symmetry of the light cone, and which enters the first body 14 from the second body as edge beam 20. The edge beam 20 enters another of the second bodies 6, and is again refracted away from the axis of symmetry of the light cone, and again enters the first body as edge beam 30 and exits from the first body 14 out of the diffuser (not shown). The edge beams 28a, 28b of the light cone which the second LED 2b generates are also refracted in the diffuser 4 away from the axis of symmetry by the second bodies 6, which are received in the first body 14. On the light emergence area 12 of the diffuser 4, therefore, the light cones which the first, second and third LEDs 2a, 2b, 2c emit overlap. The result is effective mixing of the colors which the LEDs 2a, 2b, 2c emit. By varying the intensity of the individual LEDs 2a, 2b, 2c, the color temperature can be varied. As described above, an increased proportion of red light can be wanted if the passengers in an aircraft want to relax, or on the other hand, a higher proportion of blue light can be wanted if the passengers have to concentrate. Additionally, a tone which the user wants in each application case can be given to the light which is emitted into the cabin.

The edge beams of FIG. 1 are used only to describe one embodiment of the aircraft light source. It is understood that depending on the angle of entry of a light beam of the light cone into one of the second bodies in the diffuser 4, the light beam can be refracted both away from the axis of symmetry of the light cone and towards it.

Because of its small size, the aircraft light source according to the invention can be integrated in an overhead panel or side panel 100. Because the first body 14 of the diffuser 4 is made of plastic, and the panels 100 of the aircraft cabin also consist of plastic, the aircraft light source according to the invention can be seamlessly integrated in the panels 100 of an aircraft cabin, as shown in the FIGURE. In this way, disturbing interruptions in the optical design of such panels 100, such as can occur with traditional lighting means and traditional light emission openings, are avoided.

It can be seen that the light cones which the LEDs 2a, 2b, 2c emit do not overlap on the light entry side of the diffuser 4. Because of the refraction properties of the diffuser 4 with its first body 14 and the second bodies 6 which are arranged in it and have a different index of refraction than the first body 14, the light cones are broadened by refraction in such a way that the light cones on the light emission area of the diffuser overlap at the light emission side 12. The result is particular uniform light emission. If LEDs 2a, 2b, 2c, which each emit light of a different color, are used, color mixing also occurs in the diffuser 4, as described above. The light which the diffuser 4 emits on the light emission area 12 is particularly uniform with respect to location and color.

Also, the first body 14 of the diffuser and/or the plurality of second bodies 6 can be produced from a flame-retardant and/or flame-resistant material, so that use in the aircraft is possible without problems.

The invention claimed is:

1. A panel of an aircraft cabin, comprising:
   a main panel member; and
   an aircraft cabin lighting seamlessly integrated in the main panel member, the aircraft cabin lighting including at least one LED directed toward an interior of the aircraft cabin and a diffuser, the diffuser having a first body with a constant thickness and a first index of refraction and a plurality of second bodies which are arranged in the first body and have a second index of refraction, the diffuser residing between the at least one LED and the interior of the aircraft cabin.

2. Aircraft cabin panel according to claim 1, characterized in that the first body comprises a flame-retardant and/or flame-resistant material and/or the second body comprises a flame retardant and/or flame-resistant material.

3. Aircraft cabin panel according to claim 1, characterized in that the first body (14) comprises a plastic material.

4. Aircraft cabin panel according to claim 3, characterized in that the first body comprises polycarbonate.

5. Aircraft cabin panel according to claim 1, characterized in that the second bodies comprise glass.

6. Aircraft cabin panel according to claim 1, characterized in that the second bodies are essentially spherical.

7. Aircraft cabin panel according to claim 1, characterized in that the second bodies are distributed in a plurality of planes in the first body.

8. Aircraft cabin panel according to claim 1, characterized in that in operation, the LED generates a light cone, and the diffuser has a light emission side and the LED and the diffuser are spaced at such a distance from each other that the area on a light entry side of the diffuser which is illuminated by the light cone of the LED is smaller than a light radiating area, which the diffuser generates from the light cone, on the light emission side of the diffuser.

9. Aircraft cabin panel according to claim 1, characterized in that the aircraft light source comprises a plurality of LEDs, each of the LEDs generating a light cone, the plurality of LEDs and the diffuser being spaced at such a distance from each other that the respective areas of illumination caused by the light cones of the LEDS at the light entry side of the diffuser do not overlap.

10. Aircraft cabin panel according to claim 9, characterized in that at least one LED emits light of a different wavelength than the wavelength of the light which another LED emits.

11. Aircraft cabin panel according to claim 1, characterized in that the aircraft light source comprises a plurality of LEDs, each of the LEDs generating a light cone, at least one LED emitting light of a different wavelength than the wavelength of the light which another LED emits, and the plurality of LEDs and the diffuser being spaced at such a distance from each other that the light cones of the LEDs at least partly overlap.

12. Aircraft cabin panel according to claim 1, characterized in that the degree of transmission of the diffuser ranges between about 0.8 to 0.9.

13. Aircraft cabin panel according to claim 1, characterized in that the constant thickness of the diffuser is about 1 millimeter to about 3 millimeters.

14. Aircraft cabin panel according to claim 1, wherein the panel is a side panel.

15. Aircraft cabin panel according to claim 1, wherein the panel is an overhead panel.

16. A method for lighting an aircraft comprising:
   directing light from a light source of an aircraft cabin lighting toward the inside of the aircraft, the light source comprising at least one LED seamlessly integrated in a main panel member of an aircraft panel, wherein the LED generates at least one light cone; and
   diffusing the directed light with a diffuser, the diffuser having a first body with a constant thickness and a first index of refraction and a plurality of second bodies having a second index of refraction, the diffuser having a first side illuminated by the at least one light cone and second, opposite side from which the directed light is emitted, the diffuser spaced from the at least one LED such that the area of the first side illuminated by the at least one light cone is smaller than the area of the second side from which the diffused light is emitted, the diffuser residing between the at least one LED and the inside of the aircraft.

* * * * *